(12) United States Patent
Micka (10) Patent No.: US 7,747,576 B2
(45) Date of Patent: Jun. 29, 2010

(54) INCREMENTAL UPDATE CONTROL FOR REMOTE COPY

(75) Inventor: William Frank Micka, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 996 days.

(21) Appl. No.: 10/079,458

(22) Filed: Feb. 20, 2002

(65) Prior Publication Data

US 2003/0158869 A1    Aug. 21, 2003

(51) Int. Cl.
    *G06F 12/00* (2006.01)
(52) U.S. Cl. ............................. 707/646; 707/661
(58) Field of Classification Search ............ 395/182.04, 395/489; 707/200, 202–204; 711/5–6, 112, 711/114, 161–162, 165, 204
See application file for complete search history.

(56) References Cited

U.S. PATENT DOCUMENTS

| | | | | |
|---|---|---|---|---|
| 5,504,861 A * | 4/1996 | Crockett et al. | ................ | 714/13 |
| 5,692,155 A | 11/1997 | Iskiyan et al. | ................ | 711/162 |
| 6,131,148 A | 10/2000 | West et al. | ................ | 711/162 |
| 6,189,079 B1 | 2/2001 | Micka et al. | ................ | 711/162 |
| 6,237,008 B1 | 5/2001 | Beal et al. | ................ | 707/204 |
| 6,253,295 B1 | 6/2001 | Beal et al. | ................ | 711/162 |
| 6,446,176 B1 * | 9/2002 | West et al. | ................ | 711/162 |
| 6,643,671 B2 * | 11/2003 | Milillo et al. | ................ | 707/204 |
| 6,728,736 B2 * | 4/2004 | Hostetter et al. | ............ | 707/204 |
| 2002/0053009 A1 * | 5/2002 | Selkirk et al. | ............... | 711/162 |
| 2002/0178335 A1 * | 11/2002 | Selkirk et al. | ............... | 711/162 |

* cited by examiner

*Primary Examiner*—Charles Rones
*Assistant Examiner*—Mellissa M Chojnacki
(74) *Attorney, Agent, or Firm*—Scully, Scott, Murphy & Presser, P.C.

(57) ABSTRACT

Database updates are transmitted from a primary site to a remote site. The technique includes: destaging modified data to a first volume at the primary site for a current database update, performing a first point in time virtual copy of the modified data on the first volume to a second volume at the primary site, synchronizing the second volume with a third volume, at the remote site, by transmitting the modified data of the second volume to the third volume, and performing a second point in time virtual copy of the modified data on the third volume to a fourth volume, at the remote site. Database updates at the primary site are thus decoupled from the transmission of the database updates to the remote site, so the first volume remains accessible to a host at the primary site, and the fourth volume remains accessible to a host at the remote site.

54 Claims, 5 Drawing Sheets

INCREMENTAL UPDATE CONTROL FOR REMOTE COPY

BACKGROUND OF THE INVENTION

1. Technical Field of the Invention

The present invention generally relates to remote database synchronization. More particularly, the present invention is directed to a system and method for providing asynchronous incremental database update from a primary site to a remote recovery site, which completely decouples database updates at the primary site from the transmission of the database updates to the remote recovery site, thereby facilitating efficient data backup of business-critical data and disaster recovery thereof.

2. Description of the Prior Art

In the contemporary business environment, which is so heavily dependent upon relatively uninterrupted access to various kinds of information (i.e., business-critical data), disaster recovery is often of critical importance. Explosive growth in e-commerce and data warehousing has resulted in an exponential growth of data storage, which has ripened the need for disaster recovery. Disaster recovery schemes guard the business-critical data in an event that an entire system or even a primary site storing the business-critical data is destroyed, such as for example, by earthquakes, fires, explosions, hurricanes, and the like. System outages affecting availability of data may be financially devastating to businesses in a variety of business types. For example, brokerage firms and other financial institutions may lose millions of dollars per hour when the systems are down or destroyed. Ensuring uninterrupted access to the information and guaranteeing that business data are securely and remotely updated to avoid data loss in the event of an above-described disaster are critical for safeguarding the business-critical data and business operations.

Efficient disaster recovery requires that updates to business-critical data at a primary site be synchronized at a location that is remote to the primary site (i.e., remote recovery site) in order to ensure safety of and uninterrupted access to the business-critical data. However, if business-critical data at the remote recovery site is not kept current with the business-critical data at the primary site, any updates since a last periodic backup may be lost, thus significantly impacting business operations. Thus, a key feature of the efficient disaster recovery is the frequency of resynchronization of the business-critical data from the primary site to the remote recovery site.

Generally, resynchronization of data (i.e., database updates) at a remote site principally involves two techniques: synchronous and asynchronous. Variants of the two techniques are also possible. In the synchronous technique, application host writes by an application host are forwarded to the remote site as part of the input/output (i.e., "I/O") command processing. Typically, the application host writes await remote confirmation before signaling I/O completion to the application host. There is a write latency associated with the synchronous technique because the application host awaits completion confirmation, which is further exacerbated by a physical separation of the primary site from the remote recovery site. Thus, the synchronous technique is invariably limited to relatively short distances because of the detrimental effect of a round-trip propagation delay on the I/O response completion signaling. Furthermore, until the I/O response completion signaling is received at the primary site, the application host is unable to access the data at the primary site. To the contrary of the synchronous technique, the asynchronous technique delivers application host writes over high-speed communication links to the remote recovery site while allowing the application host at the primary site to access the data. That is, the asynchronous technique signals I/O completion to the application host at the primary site before updating the remote recovery site. The asynchronous technique is often utilized when the distance between primary and the remote recovery sites (as well as possibly a relative low-bandwidth telecommunication link) would introduce prohibitive latencies if performed synchronously. However, it is clearly evident that a long-distance communication link may become a bottleneck that forces local I/O writes to be queued for transmission to the remote site. The queuing of I/O writes at the primary site negatively affects efficient disaster recovery since the queued I/O writes may be destroyed in an above-described disaster before they are transmitted to the remote recovery site.

The frequency for the resynchronization of the business-critical data from the primary site to the remote recovery site takes into account a space and a time dimension. The space dimension ultimately accounts for the amount of data, while the time dimension accounts for the time period when resynchronization occurs. A resynchronization that involves copying all of the data represents a full database backup, while an incremental database backup copies only a portion of the data that has changed since the last full or incremental database backup. Whether full or incremental, either backup method represents a time-consistent view of the data at the primary site. While individual host application I/O writes may be synchronously or asynchronously transmitted to the remote recovery site as they are made at the primary site, this fact presents a cost inefficiency in that the communication link between the primary site and the remote recovery site must be maintained (i.e., reserved or leased) to transfer the application host writes on a continuous basis.

A particularly useful resynchronization system is a Peer to Peer Remote Copy (i.e., "PPRC") system offered by International Business Machines, Corporation (i.e., "IBM"), the assignee of the subject patent application. The PPRC provides synchronous copying of database updates from a primary Direct Access Storage Device (i.e., DASD) controller at a primary site to a remote DASD controller at the remote recovery site. That is, the PPRC system includes a primary controller and an associated primary DASD at the primary site and a remote controller and an associated DASD at the remote recovery site. Generally, each of the controllers includes a non-volatile storage (i.e., "NVS") for maintaining data in the event of power or system failure. During resynchronization, the data is first written (or buffered) to the NVS of the primary controller at the primary site, the data is then transferred to the NVS in the remote controller at the remote recovery site. At later points in time, the data at the primary and remote NVS is destaged to the attached DASD storage devices (i.e., disk), i.e., the data is written from the NVS to the associated DASD storage device. It should be noted that a single DASD storage device may include more than one volume or a single volume may span more than one DASD storage devices. It should further be noted that with the PPRC system, the remote recovery site's DASD volume(s) are synchronously updated with data updates to the primary DASD volume(s).

One persistent problem with the PPRC system is that the volumes, which are synchronized between the primary and remote DASD storage devices, are unavailable for use while the PPRC data updates are serviced. The PPRC system does not consider the transfer of data to the remote recovery site complete until all the data updated at the DASD of the primary site has been updated at the DASD of the remote recovery site. Thus, data updates to the DASD of the primary site invariably delay response times to user requests to the volumes involved in the data updates because synchronous updates must be made to the DASD of the remote recovery site before the volumes involved in the updates are available to service the user requests. Response time delays may occur with respect to user requests to the DASD of the primary and remote recovery sites. Therefore, the user requests to volumes of either the primary or remote recovery site's DASD are subject to the data updates between the primary and the remote recovery sites and must therefore wait until the completion of the data updates before the requests can access the updated data.

Therefore there is a need in the art for providing a system and method that efficiently performs asynchronous incremental database updates from a primary site to a remote recovery site, thereby completely decoupling data updates at the primary site from the transmission of the data updates to the remote recovery site.

SUMMARY OF THE INVENTION

It is therefore an object of the present invention to provide a system and method for performing data updates at a remote site asynchronously from data updates at a primary site, thereby completely decoupling the data updates at the primary site from the transmission of the data updates to the remote recovery site.

According an embodiment of the present invention, there is provided a method for asynchronously transmitting one or more incremental database updates from a primary site to a remote site, the primary site and the remote site interconnected by at least one communication link. The method includes: (a) destaging modified data to a first volume at the primary site for a current database update and updating one or more bits in a first bitmap at the primary site that indicate one or more tracks on the first volume that are to be overwritten with the modified data; (b) performing a first point in time copy of the modified data of the first volume to a second volume at the primary site by transferring the first bitmap to a second bitmap at the primary site for indicating the modified data that is to be transmitted to a third, volume at the remote site for the current database update; (c) synchronizing the second volume with the third volume for the current database update by transmitting the modified data of the second volume to the third volume as indicated by the one or more bits in the second bitmap; and (d) performing a second point in time copy of the modified data of the third volume to a fourth volume at the remote site. A corresponding system and program storage device are also provided.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENT OF THE INVENTION

The present invention is directed to a method and system for providing remote asynchronous incremental data update. More particularly, the present invention is directed to providing an efficient mechanism for updating a remote copy of a database with asynchronous incremental updates to a local database, in which the data updates at the primary site are completely decoupled from the transmission of the data updates to the remote recovery site.

Figure 1:
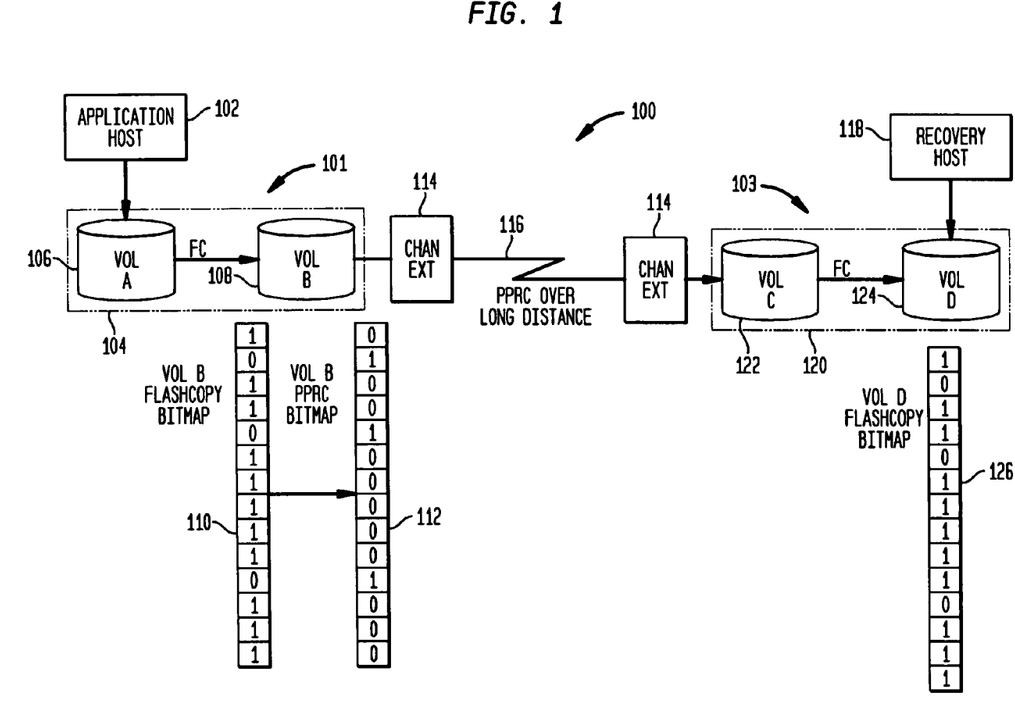
FIG. 1 is an exemplary system diagram for accomplishing asynchronous incremental database update from a primary site to a remote recovery site according to the present invention.

FIG. 1 is an exemplary system diagram of a Remote FlashCopy system 100 for accomplishing the asynchronous incremental database update from a primary site 101 to a remote recovery site 103 according to the present invention. The Remote FlashCopy system 100 utilizes FlashCopy (i.e., "FC") technology coupled with peer-to-peer remote copy (i.e., "PPRC") technology to provide an asynchronous data update (i.e., database update) that obviates the above-identified limitations of the prior art. Although it is contemplated that there may be one or more application hosts 102 and one or more recovery hosts 118, for ease and clarity of the following description, the one or more application hosts and the one or more recovery hosts will simply be referred to as the application host 102 and the recovery host 118, respectively. In operation, the Remote FlashCopy system 100 is asynchronous because the application host 102 at the primary site 101 does not have to wait for the data updates to be recorded at the remote recovery site 103 before an ending status for the data updates at the primary site 101 is presented to the application host 102, i.e., ending status being presented immediately upon update of Volume A 106.

Now referring to FIG. 1, there are depicted four volumes (i.e., logically designated as volumes A, B, C, D), which are utilized for above-identified asynchronous migration, backup and disaster recovery solution. It should be noted that the number of volumes is in exemplary fashion limited to four for brevity and clarity, and that the number of volumes may significantly vary depending on a particular requirements for the Remote FlashCopy system 100. The Remote FlashCopy system 100 is enabled to keep data on Volume D 124 time-consistent or synchronized with data on Volume A 106, where both volumes are remote to one another. A peer-to-peer connection between Volume B 108 of the primary site 101 and Volume C 122 of the remote recovery site 103 is accomplished via two channel extenders 114 and at least one communication link 116. The channel extenders 114 enable the peer-to-peer connection between Volume B 108 and Volume C 120 over longer distances. It is noted that the channel extenders 114 are not required, and the peer-to-peer connection between Volume B 108 and Volume C 122 may directly be established via the at least one communication link 116. The at least one communication link 116 may include any suitable communication links known in the art, including channel links, T1/T3 links, Fibre channel, International Business Machines (i.e., "IBM") Enterprise System Connection (i.e., "ESCON") links, and the like. Notwithstanding the fact that the primary site 101 and remote recovery site 103 are depicted in FIG. 1 as being in remote geographic locations with regard to one another, one skilled in the art understands that the primary and the remote recovery sites may be located anywhere with respect to each other, i.e., at the same geographic location, at locations a short distance apart, or further at locations a long distance apart.

Further with reference to FIG. 1, the primary site 101 comprises the application host 102 that is coupled to Volume A 106, which updates the data stored on Volume A 106. The primary site 101 further comprises a local Logical Subsystem (i.e., local "LSS") 104 that includes a local FlashCopy pair of volumes, such as volumes A 106 and B 108, which is involved in the data update at the primary site 101 and which also facilitates data update at the remote recovery site 103. LSS 104 includes local DASD controller (depicted in FIG. 5 and described below) for managing access to both Volume A 106 and Volume B 108. In the local FlashCopy pair, Volume A 106 is a source volume and volume B 108 is a target volume. Similarly, the remote recovery site 103 comprises a recovery host 118 that is coupled to Volume D 124. Upon disaster or failure affecting the primary site 101, the recovery host 118 may immediately begin accessing data from Volume D 124 at the remote recovery site 103 to recover from the failure or disaster of the primary site 101. The remote recovery site 103 similarly further comprises a remote Logical Subsystem 120 (i.e., remote "LSS") that includes a remote FlashCopy pair of volumes, such as volumes C 122 and D 124. The remote LSS 120 also includes a remote DASD controller (depicted in FIG. 5 and described below) for managing access to Volume C 122 and Volume D 124. In the remote FlashCopy pair, Volume C 122 is a source volume and volume D 124 is a target volume. Additionally, Volume B 108 of the primary site 101 and Volume C 122 of the remote recovery site 103 form a peer-to-peer remote copy (i.e., "PPRC") pair in which Volume B 108 is a primary volume and Volume C 122 is a secondary volume. As particularly noted above regarding the fact that the local LSS 104 of primary site 101 and the remote LSS 120 of the remote recovery site 103 are depicted as being remote to one another, one skilled in the art understands that the local and remote subsystems 104, 120 may be located anywhere with respect to one another, i.e., at the same location, or at locations a short distance apart, or further at locations a long distance apart, as particularly illustrated in the exemplary FIG. 1.

Yet further with reference to FIG. 1, in addition to the Remote FlashCopy system 100 managing data updates at the primary site 101, the Remote FlashCopy system 100 further controls asynchronous incremental data updates at a remote recovery site 103. The method for managing remote data updates at the remote recovery site is described in greater detail below with reference to FIGS. 2 and 3. At this point, an overview of the operation of the Remote FlashCopy system 100 is presented for context and clarity. At first, an initial copy of the database (or portions thereof) included in Volume A 106 is made to Volume D, as will be described below with respect to FIG. 2. To perform the initial copy, a FlashCopy from Volume A to Volume B sets all bits in the FlashCopy Bitmap 110 on Volume B to 'ones', thereby initializing the FlashCopy bitmap. It should be noted that the bits in the FlashCopy bitmap 110 represent the tracks of data on Volume A 106 that are updated. The setting of all bits to 'ones' represents the fact that all data is to be copied, and also represents the fact that all data to be copied is stored on Volume A. It should further be noted that the FlashCopy performs a byte-for-byte virtual copy of data from Volume A 106 to Volume B 108, i.e., no physical data is copied from Volume A to Volume B. The FlashCopy bitmap 110 on Volume B 108 represents a frozen image of data on Volume A 106 at a particular point in time, such as time T0. The FlashCopy bitmap 110 indicates the data on Volume A 106 that has changed since a last FlashCopy and further indicates the data that will be sent from the primary site 101 to the remote recovery site 103. At the time T0, the FlashCopy 110 includes all 'ones', which indicates that all data is to be transferred to Volume C and that the data is stored on Volume A. Subsequently, the FlashCopy bitmap 110 is converted into a peer-to-peer remote copy (i.e., "PPRC") bitmap 112 on Volume B, which exists in a peer-to-peer remote copy ("PPRC") state with Volume C 120, i.e., a PPRC session being established between Volume B 108 and Volume C 122. More particularly, the PPRC volumes (i.e., Volume B 108 and Volume C 122) are identified as participating in a PPRC state in which updates to the local primary PPRC volume (i.e., Volume B 106) are detected and therefore transmitted to the remote secondary volume (i.e., Volume C 122). During the conversion, each bit of the FlashCopy bitmap 110 is inverted into the PPRC bitmap 112. Thus, the conversion inverts all 'ones' to all 'zeroes' in the PPRC bit map 112. The PPRC bitmap 112 is set up in order to transfer the data represented as changed on Volume A in the FlashCopy bitmap 110 to Volume C 122 via the PPRC session. Once the data is copied to Volume C, a FlashCopy is performed from Volume C 122 to Volume D 124, wherein Volume D 124 is time-consistent with Volume A 106 at time T0.

Following the initial copy of the data from Volume A 106 to Volume D 124, updates to the data on Volume A 106 are recorded in the FlashCopy bitmap 110 on Volume B 108, by setting a corresponding bit to a 'zero'. That is, a 'zero' in FlashCopy bitmap 110 indicates that Volume B includes the data to be updated, whereas a 'one' represents that Volume B does not include the data to be updated and that this data is instead included on Volume A 106. It should be noted that the data on Volume A 106 is copied to Volume B 108 upon demand, i.e., when the particular data on Volume A is to be overwritten (i.e., updated) with updated data upon destaging. The FlashCopy on Volume B represents all of the changes to volume A with relationship to Volume B, where the data may either be located on Volume A or Volume B as particularly represented by the FlashCopy bitmap 110. Subsequently to the initialization described above or a previous data update, at a time interval (e.g., 30 minutes, 1 hour, or the like) since the initialization or the previous update, destaging of all modified data for volume A is initiated. In general, destaging is a process of asynchronously writing modified data from a non-volatile cache to a disk in the background while read/write requests from a host system are serviced in the foreground. It should be noted that destaging may be based upon occupancy of the nonvolatile cache, such as when the cache is full, or may be user-initiated.

Still further with reference to FIG. 1, in the present invention, the destaging is preferably automatically initiated. More particularly with reference to FIG. 1, modified data that is cached in a non-volatile store (i.e., NVS) memory associated with the local logical subsystem 104 is destaged (i.e., written) to Volume A 106 during the initialization of the FlashCopy of Volume A 106 to Volume B 122. The destaging of modified data causes a 'one' bit in the FlashCopy bitmap 110 in Volume B to be changed to a 'zero' bit by moving modified data from Volume A 106 to Volume B 108. After the destaging, the FlashCopy bitmap 110 is then transferred to a PPRC bitmap 112 by inverting the bits in the FlashCopy bitmap 110 into the PPRC bitmap 112. Therefore, the 'ones' in PPRC bitmap 112 indicate that the tracks of data associated with these bits have been updated with the modified data and that the modified data is to be transmitted to Volume C in order to synchronize Volume A 106 to Volume D 124. More particularly, when the PPRC bitmap is updated, application host 102 may read/write Volume A 106 since Volume B 108 includes a consistent point-time copy of Volume A 106. Once data indicated by the PPRC bitmap 112 as modified is transferred to Volume C, a FlashCopy of Volume C 122 to Volume D 124 is performed, in which a virtual copy of data is performed as described above with regard to the FlashCopy of Volume A 106 to Volume B 108. A FlashCopy Bitmap 126 records any updates received by and destaged at Volume C 122. Thus, at this point Volume D 124 has a time-consistent copy of the modified data at Volume B 108, which represents Volume A 106, i.e., thereby Volume A and Volume D are time-synchronized at that point in time. As will be described in greater detail with reference to FIG. 3, time-synchronized copies may be staggered for performing the incremental update more efficiently, according to the present invention.

Figure 2:
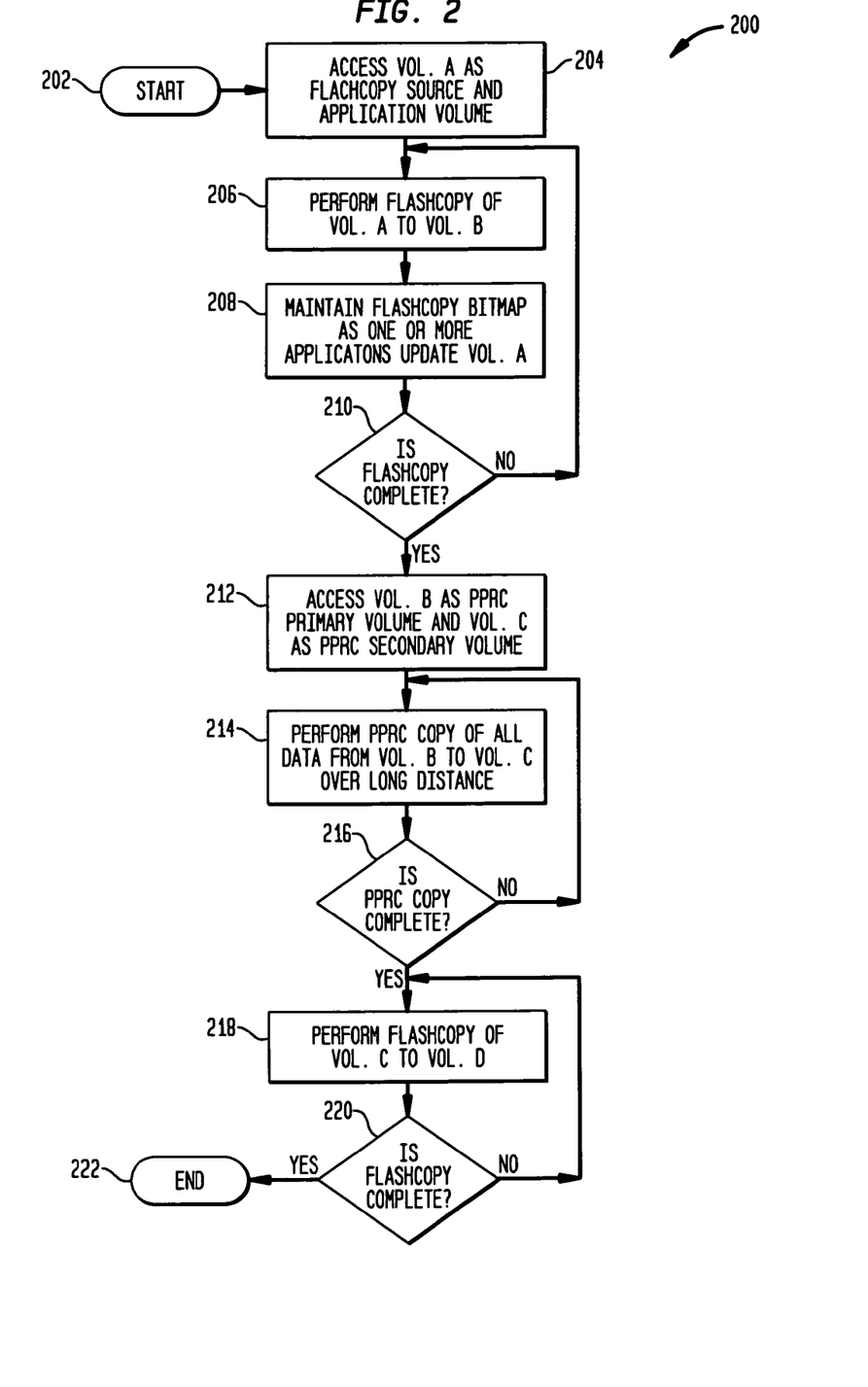
FIG. 2 is an exemplary method flowchart illustrating an initial setup performed for enabling the asynchronous incremental database update from a primary site to a remote recovery site of FIG. 1 according the present invention.

FIG. 2 is an exemplary method flowchart 200 illustrating the initial setup performed that enables the asynchronous incremental database update from a primary site 101 to a remote recovery site 103 illustrated in FIG. 1, according the present invention. It should be noted that the application host 102 utilizes the data (i.e., reads, writes and updates the data) on Volume A 106 for business-critical purposes. The method for the initial setup according to the present invention begins at step 202, where the application host 102 via a control manager (not shown) initiates an initial copy of data (total database or a subset thereof) at Volume A 106 to Volume D 124 (or a refresh of the database at Volume D 124). A user may implement via the control manager update policies at the application host 102 regarding database updates. The policies may include starting the copying at user discretion, copying at scheduled or specific times, and copying that is cycled periodically upon completion of previous iterations. The time it takes to copy the entire database is determined by a total number of volumes that the database spans, the physical distance between the primary site 101 and the remote recovery site 103 (i.e., distance between Volume B 108 and Volume C 122), and a number of communication links 116 between the sites 101 and 103. For example, a 12-terabyte database with 4 IBM's ESCON communication links 116 between the primary site 101 and remote recovery site 103, each link 116 running at a rate of 12.5 megabytes per second, will take about 3 days to complete the copy.

Figure 4:
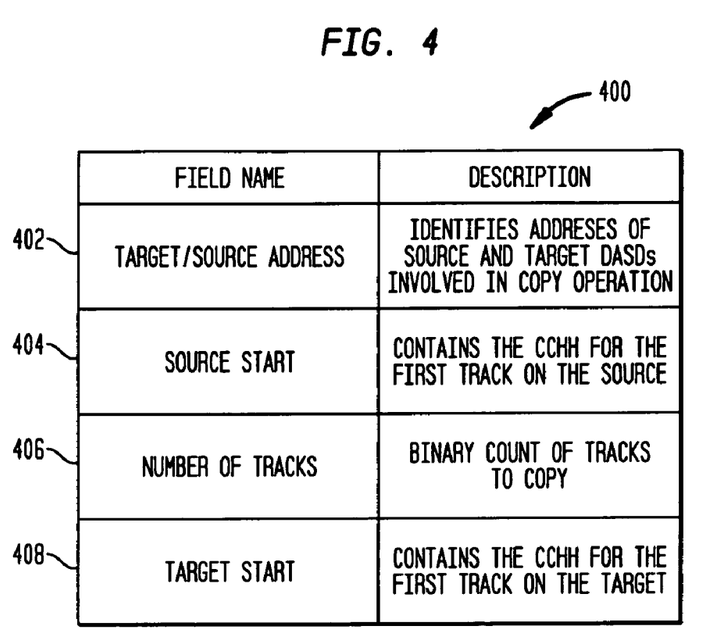
FIG. 4 is an exemplary relationship table for representing the relationship between a pair of volumes of a FlashCopy pair at the primary site according to the present invention.

Further with reference to FIG. 2, at step 204 Volume A 106 is accessed as a FlashCopy source and application volume by the application host 102. A FlashCopy of Volume A 106 to Volume B 108 is then performed at step 206, which sets up a relationship between Volume A and Volume B with regard to the data on Volume A 106. As mentioned above, the Flash-Copy performs byte-for-byte virtual copy of data from Volume A 106 to Volume B 108. Although no physical data is copied from Volume A to Volume B at this point, the Flash-Copy sets all the bits in the FlashCopy bitmap 110 on Volume B to 'ones' (i.e., initializing the FlashCopy bitmap), which represents that all of the data is stored on Volume A 106 and no data is stored on Volume B 108. For representing the relationship, a relationship table illustrated in FIG. 4 below is also set up on Volume B, which among other things, identifies Volume A 106 and Volume B 108 and provides pointers to the location of data on Volume A 106 and where the data is to be copied on Volume B 108. The relationship table will be described in further detail below with reference to FIG. 4. Additionally, while the FlashCopy is in progress, any updates by the application host 102 to the data in the database on Volume A 106 are maintained in the FlashCopy bitmap 110 and the relationship table at step 208. That is, upon demand to overwrite (i.e., update) data on Volume A by the application host 102, the data to be overwritten is copied from Volume A to Volume B 108 and the FlashCopy bitmap 110 is updated for the one or more tracks representing the updated data from a 'one' to a 'zero' in the FlashCopy bitmap 110. Thus, the FlashCopy preserves the state of the data at the time when FlashCopy was initiated, i.e., time T0, by physically copying the data from Volume A to Volume B before any update to that data is possible on Volume A. The relationship table illustrated below in FIG. 4 is updated with a number of tracks of data to copy. Therefore, the FlashCopy bitmap 110 represents the changes to the relationship between Volume A 106 and Volume B 108 with regard to the data. At step 210, it is determined whether the FlashCopy from Volume A 106 to Volume B 108 is logically complete, and if the FlashCopy is not complete the method continues at step 206. Otherwise, the method continues at step 212, where Volume B 108 is accessed as a PPRC primary volume and Volume C is accessed as a PPRC secondary volume, i.e., a PPRC connection or session between Volume B 108 and Volume C 120 is thereby established.

Yet further with reference to FIG. 2, at step 214 a PPRC copy of all data from Volume B 108 to Volume C 122 is performed. Since this is the initial or first copy of data, the PPRC sets the PPRC bitmap 112 to all 'ones' to represent that all data is to be copied during the initial copy of data. In operation, the PPRC inspects the PPRC bitmap 112 to identify which tracks of data are to be copied (in this case all data represented by 'ones') to the remote Volume C 122, and then transfers the data from the identified storage locations (i.e., tracks) to volume C 122. It is noted that at the initialization of the FlashCopy bitmap 110 at step 206, all of the data is stored on Volume A 106 as particularly represented by all 'ones' in the FlashCopy bitmap 110. Therefore, during the PPRC session, PPRC reads Volume B 108 and inspects the FlashCopy bitmap 110 to determine if the data is on Volume A 106 or Volume B 108. All data is copied from Volume B 106 according to step 214 as specified in the FlashCopy 110, which specifies that all data is stored on Volume A 104. At step 216, it is determined whether the PPRC copy of all data from Volume B 106 to Volume C 122 is complete. If the PPRC copy of data to Volume C is not complete, the method continues at step 214. Otherwise, the method continues at step 218, where a FlashCopy of Volume C 122 to Volume D 124 is performed. The FlashCopy virtually copies the data on Volume C 122 to Volume D 124. As mentioned above regarding the FlashCopy, Volume D 124 also includes a FlashCopy bitmap 126 that represents where the data is actually stored, i.e., whether on Volume C 122 or Volume D 124. At step 220, it is determined whether the FlashCopy of Volume C to Volume D is complete. If the FlashCopy is complete, the method ends at step 220, otherwise the method continues at step 218. At this point, all data on Volume D 124 is time-consistent with Volume A 104, i.e., such as at time T0. The initial setup for enabling the asynchronous incremental database update according to the present invention is ended at step 222.

Figure 3:
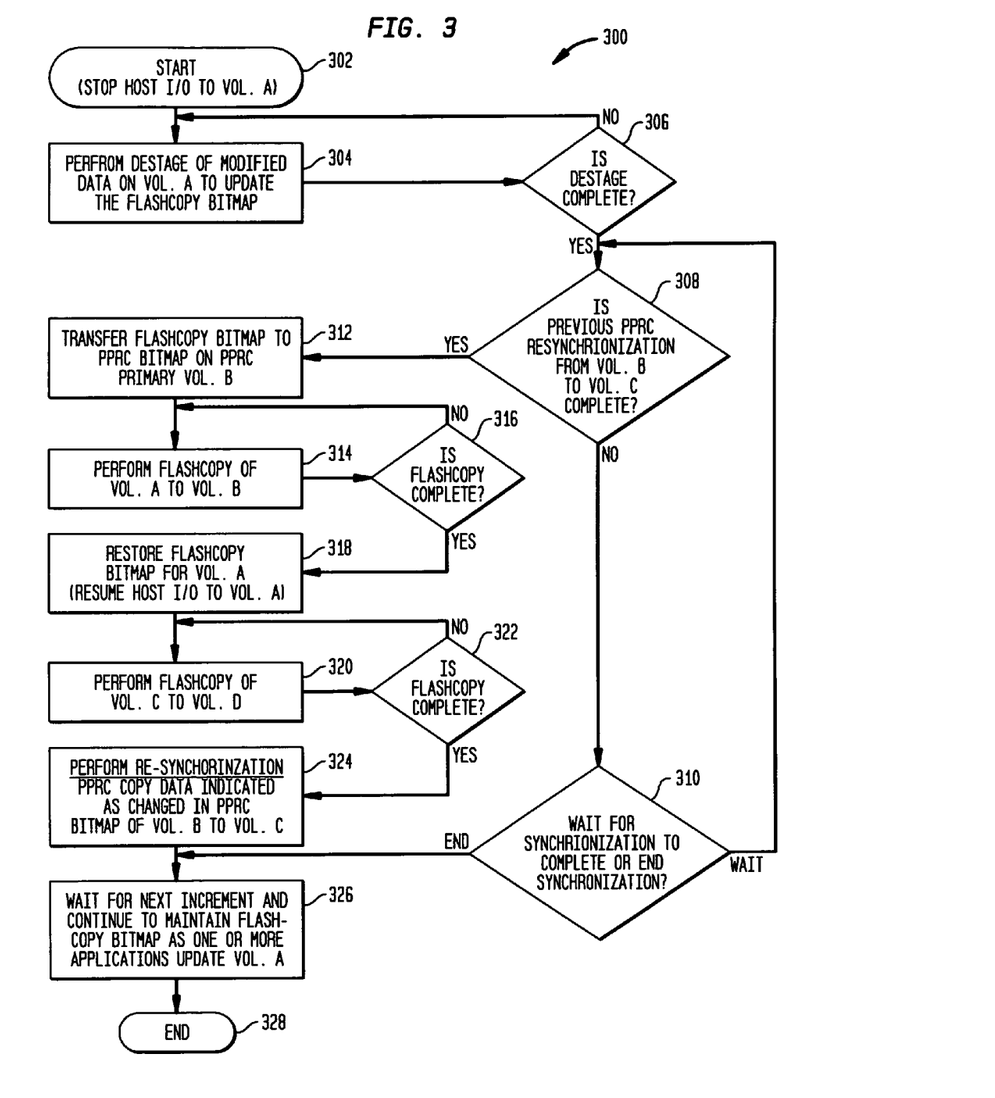
FIG. 3 is an exemplary method flowchart illustrating the asynchronous incremental database update from a primary site to a remote recovery site according the present invention.

FIG. 3 is an exemplary method flowchart 300 illustrating the asynchronous incremental database update from a primary site 101 to a remote recovery site 103 of FIG. 1 according the present invention, after the initial setup is performed according FIG. 2. Before FIG. 3 is described in detail, for clarity it is noted that the method of FIG. 3 represents a staggered sequence of time-consistent incremental updates (i.e., increments), such as time T0, T1 and T2, as will pointed out in the following description. Staggering allows for efficiently performing the incremental update according to the present invention. The method begins at step 302, when the application host 102 initiates a time-consistent incremental update of the data (i.e., an increment) on Volume A 106 at time T1, i.e., a current increment. It is noted that the time-consistent copy of data according to FIG. 2 represents a time-consistent increment at time T0. With regard to the aforementioned control manager, a user via the control manager of application host 102 initiates the current increment. It should be noted that this point, application host 102 updates of data (i.e., host I/O) on Volume A 106 are blocked until completion of step 318, which is described below. At step 304, modified data is destaged from the NVS to Volume A 106, which forces an update to the FlashCopy bitmap 110. It should be noted that a FlashCopy relationship between Volume A 106 and Volume B 108 initializing the FlashCopy bitmap 110 was established at step 206 of FIG. 2. During destaging of the modified data to Volume A 106 at step 304, the data on Volume A 106 that is to be overwritten with the modified data from the NVS is copied from Volume A 106 to Volume B 108 and the bits in FlashCopy bitmap 110 associated with the copied tracks of data are updated to 'zeroes' in the FlashCopy bitmap 110. The data thus copied to Volume B 108 represents a previous increment in time, i.e., increment at time T0. Thus, the FlashCopy bitmap 110 is inspected and data is copied from Volume A 106 to Volume B 108 only if the bits in the FlashCopy 110 bitmap associated with the tracks of data are set to 'ones', which means that the data prior to being overwritten is transferred to Volume B 108. However, if the tracks in the FlashCopy bitmap 110 are 'zeroes', then the data to be overwritten is not copied to Volume B 108, since Volume B already includes a copy the data. At this point, i.e., after the destaging at step 304, the FlashCopy bitmap 110 represents a time-consistent increment at time T1 of the data at Volume A. In addition, Volume B 108 physically includes data copied from Volume A 106 before it is overwritten during destaging of Volume A 106. At step 306, it is determined whether the destaging is complete, and if not complete, the method continues at step 304 until the destaging of modified data is complete.

Further with reference to FIG. 3, at step 308 it is determined whether a previous PPRC resynchronization from Volume B 108 to Volume C 122 is complete, i.e., such as at step 216 described above with reference to FIG. 2 or step 324 described below with reference to FIG. 3. As noted above, during the PPRC synchronization data is physically copied according to the PPRC bitmap from either Volume A 106 or Volume B 108 to Volume C 122, according to the bits in the PPRC bitmap 112. It is again noted that the resynchronization at step 308 represents a previous increment, i.e., increment at time T0. At step 310, it is further determined whether to wait for resynchronization at time T0 to complete or end the resynchronization. Generally, resynchronization will be allowed to complete at step 308. Alternatively, if for instance the at least one communication link 116 between the primary site 101 to the remote recovery site 103 fails, the increment at time T0 is ended and the method flowchart continues to step 326. Referring back to step 312, the updated FlashCopy bitmap 110 for the current increment (i.e., time T0) is then transferred (i.e., bits in the bitmap representing tracks of data are inverted) to a PPRC bitmap 112 at Volume B 108, which serves as a PPRC primary volume. At step 314, a FlashCopy of Volume A 106 to Volume B 108 is then performed. It is noted that this FlashCopy is now for a subsequent increment at time T2, since the FlashCopy bitmap 110 for the current increment at time T1 has now been transferred to PPRC bitmap 112 at step 312, which now includes bits representing the tracks of data that have been updated for the current increment at time T1. At step 316, it is determined whether the FlashCopy of Volume A 106 to Volume B 108 is complete. If the FlashCopy is not complete, the method continues at step 314. Otherwise, at step 318 the FlashCopy bitmap 110 for Volume A 106 is restored or initialized to all 'ones', and the application host 102 is allowed to resume updating data (i.e., host I/O) on Volume A 106, which was blocked at step 302 described above.

Yet further with reference to FIG. 3, at step 320 a FlashCopy of Volume C 122 to Volume D 124 is performed for a previous time increment, i.e. increment at time T0. As noted above, the FlashCopy may perform a virtual copy, which does not physically copy any tracks of data from Volume C 122 to Volume D 124. Thereafter, at step 322, it is determined whether the FlashCopy of Volume C 122 to Volume D 124 is complete. If the FlashCopy is not complete, the method continues at step 320. Alternatively, the method continues at step 324. After the FlashCopy at step 320 is complete, data at Volume D 124 is a virtual copy of data on Volume A 106 at time T0. At step 324 a resynchronization is performed, i.e., a PPRC copy of data indicated as changed in the PPRC bitmap 112 is performed from Volume B 108 to Volume C 122 for time increment T1, i.e., the current time increment. At step 326, the method 300 waits for the next incremental update (i.e., increment at time T2) and continues to maintain the FlashCopy bitmap 110, which was initialized at step 318, as the application host 102 updates Volume A after the incremental update at increment time T1. The incremental database update method ends at step 328. It is noted that during the next increment at time T2, a FlashCopy of Volume C 122 to Volume D 124 for the current increment at time T1 is performed at step 320. The incremental database update illustrated in FIG. 3 may be repeated an indefinite number of times, such as at increment times T1, T2, T3 . . . Tn, where n is indefinite.

FIG. 4 is an exemplary relationship table 400 for representing a relationship between a Volume A 106 and Volume B 108 of a FlashCopy pair at the primary site 101 according to the present invention. FIG. 2 particularly illustrates fields 402-408 in the relationship table 400 that are maintained by the DASD controller associated with the local LSS 104 of the with primary site 101. The relationship table 400 is generated at step 204 in FIG. 2. At step 208 of FIG. 2, the relationship table 400 is accessed when the application host 102 updates Volume A 106 to determine target addresses for the updates on Volume B 108. The first field, the target/source device address 402, identifies the address of the source DASD and target DASD involved in the copy operations. The second filed, the source start field 404, identifies the first track in the source DASD from where data is to be copied. The third field, the number of tracks field 406, indicates the number of tracks to be copied. The fourth field, the target start field 410, indicates the first track to which data is copied to in the target DASD. It should be noted that additional fields may be provided in the relationship table 400 as may be required for specific applications.

Figure 5:
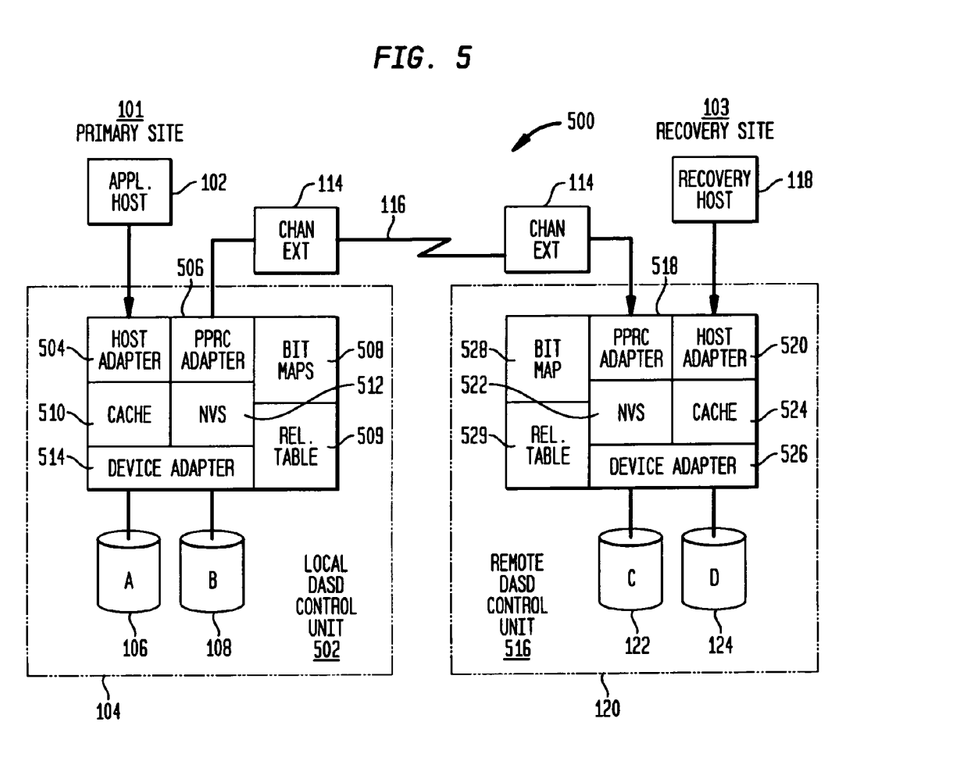
FIG. 5 is a more detailed system diagram of the exemplary system in FIG. 1 for accomplishing the asynchronous incremental database update from a primary site to a remote recovery site according to the present invention.

FIG. 5 is a more detailed system diagram 500 of the exemplary Remote FlashCopy system 100 system of FIG. 1 for accomplishing the asynchronous incremental database update from a primary site to a remote recovery site according to the present invention. FIG. 5 particularly illustrates exemplary DASD controller units (i.e., controllers) 502 and 516 associated respectively with the local LSS 104 for the primary site 101 and the remote LSS 120 for the remote site 103. It is noted that the DASD controllers 502 and 516 include microcode (i.e., Unicode) for performing the asynchronous incremental database updates according to the present invention. Preferably, each of the respective DASD controllers 502 and 516 includes an internal disk (not shown) that is specifically used by each respective controller for storing the microcode and loading the microcode into processor memory (not shown) associated with each DASD controller for execution. The local DASD controller 502 includes a host adapter 504 for enabling communication (i.e., read/write/update of data) between the application host 102 and the local DASD controller 502. The remote DASD controller 516 likewise includes a host adapter 520 for enabling communication (i.e., read/write/update of data) between the recovery host 118 and the remote DASD controller 516. The DASD controllers 502 and 516 include PPRC adapters 506 and 518 for establishing a PPRC session to enable transmission of database updates from the primary site 101 to the remote recovery site 103 according to the present invention. Cache 510 in the local DASD controller 502 caches the most recently accessed data from Volumes A 106, thereby providing improved performance of the application host 102 since data may be obtained from the cache 510 instead of the associated volume A 106 if there is a cache hit. As described above, NVS 512 of the local DASD controller 502 buffers modified data until it is written to the associated primary Volume A 106. Cache 524 and NVS 522 of the remote DASD controller 516 provide like functionality to that of the cache 510 and NVS 512 of the local DASD controller 502. Device adapters 514 and 526 enable respective DASD controllers 502 and 516 to access data on the associated Volumes A-D (i.e., reference numbers 106, 108, 122 and 124). The local DASD controller 502 provides a memory area 508 for maintaining (i.e., storing and modifying) the FlashCopy bitmap 110 and the PPRC bitmap 112 and memory area 509 for maintaining the relationship table 400 according to the present invention. The remote DASD controller 516 likewise provides memory areas 528 and 529 for respectively maintaining a FlashCopy bitmap 126 and relationship table 400. It is noted that the stored bitmaps and tables are read into the processor memory (not shown) associated with each respective DASD controller, modified according to the present invention, and the modified bitmaps and table are then written to each respective DASD controller.

While the invention has been particularly shown and described to a preferred embodiment thereof, it will be understood by those skilled in the art that the foregoing and other changes in forma and details may be made therein without departing from the spirit and scope of the invention.

Having thus described our invention, what I claim as new, and desire to secure by Letters Patent is:

1. A method for asynchronously transmitting one or more incremental database updates from a primary site to a remote site, the primary site and the remote site interconnected by at least one communication link, the method comprising:
(a) destaging from cache memory modified data to a first volume at the primary site for a current database update and updating one or more bits in a first bitmap at the primary site that indicate one or more tracks on the first volume that are to be overwritten with the modified data, said updating one or more bits being a first point in time virtual copy of the modified data of the first volume to a second volume, wherein the first point in time virtual copy updates the first bitmap and no physical data is copied from the first volume to the second volume;
(b) transferring the first bitmap to a second bitmap at the primary site for indicating the modified data that is to be transmitted to a third volume, which is at the remote site, for the current database update, the transferring including at least inverting bits of the first bitmap to the second bitmap;
(c) synchronizing the second volume with the third volume for the current database update by transmitting the modified data from either the first volume or the second volume depending on bit setting in the first bitmap, to the third volume as indicated by the one or more bits in the second bitmap; and
(d) performing a second point in time virtual copy of the modified data of the third volume to a fourth volume, which is at the remote site.

2. The method of claim 1, wherein the first bitmap represents a FlashCopy bitmap and the second bitmap represents a peer-to-peer remote copy (PPRC) bitmap.

3. The method of claim 1, wherein the first point in time virtual copy is achieved by flashcopying the modified data of the first volume to the second volume.

4. The method of claim 3, wherein the flashcopying initializes the one or more bits in the first bitmap.

5. The method of claim 1, wherein the second point in time virtual copy is achieved by flashcopying the modified data of the third volume to the fourth volume.

6. The method of claim 1, further comprising providing an application host that is associated with the first volume for performing the one or more incremental database updates.

7. The method of claim 1, further comprising staggering the one or more incremental database updates during the current database update.

8. The method of claim 7, wherein the staggering comprises:
determining whether a synchronization for a previous database update is complete after the destaging is performed for the current database update; and
waiting for the synchronization of the previous database update to complete before the performing the first point in time virtual copy for the current database update.

9. The method of claim 8, wherein the staggering further comprises:
initializing the first bitmap for a next database update after the performing the first point in time virtual copy for the current database update; and
waiting for the next database update after the synchronizing for the current database update.

10. The method of claim 1, wherein the synchronizing is achieved by establishing a peer to peer remote copy session between the second volume and the third volume for physically transmitting the modified data of the second volume over the at least one communication link to the third volume.

11. The method of claim 1, further comprising providing a controller at the primary site for managing access to both the first volume and the second volume; and
providing a controller at the remote site for managing access to the third volume and the fourth volume.

12. The method of claim 1, wherein during the synchronizing, the first volume is accessible to a host at the primary site, and the fourth volume is accessible to a host at the remote site.

13. The method of claim 1, wherein the step of performing includes performing a first point in time virtual copy of the modified data of the first volume to a second volume at the primary site by updating the first bitmap and transferring the first bitmap to a second bitmap at the primary site for indicating the modified data that is to be transmitted to a third volume, which is at the remote site, for the current database update; and
the step of synchronizing includes synchronizing the second volume with the third volume for the current database update by determining from the first bit map whether the modified data of the second volume to be transmitted is located in the first volume or the second volume and transmitting the modified data of the second volume to the third volume as indicated by the one or more bits in the second bitmap.

14. The method of claim 1, further comprising:
initializing the first bitmap to indicate that all data on the first volume is to be copied to the second volume, and all data that is copied to the second volume is to be copied to the third volume.

15. The method of claim 1, further comprising providing a recovery host that is associated with the fourth volume for recovering from a failure of the primary site by providing access to the fourth volume.

16. The method of claim 1, further comprising automatically initiating the incremental database updates.

17. The method of claim 1, wherein the destaging further comprises:
inspecting the one or more bits of the first bitmap at the primary site to determine whether the second volume includes data of the one or more tracks on the first volume that are to be overwritten with the modified data; and
performing a point in time virtual copy, from the first volume to the second volume, of the data of the one or more tracks on the first volume that are to be overwritten with the modified data if the first bitmap indicates that the second volume does not include the data of the one or more tracks on the first volume that are to be overwritten with the modified data.

18. The method of claim 1, wherein the at least one communication link comprises at least one of a channel link; a T1/T3 link; a Fibre channel; and an ESCON link.

19. A system for asynchronously transmitting one or more incremental database updates from a primary site to a remote site, the primary site and the remote site interconnected by at least one communication link, the system comprising:
a processor memory;
means for destaging from cache memory modified data to a first volume at the primary site for a current database update and updating one or more bits in a first bitmap at the primary site that indicate one or more tracks on the first volume that are to be overwritten with the modified data, said updating one or more bits being a first point in time virtual copy of the modified data of the first volume to a second volume, wherein the first point in time virtual copy updates the first bitmap and no physical data is copied from the first volume to the second volume;
first means for transferring the first bitmap to a second bitmap at the primary site for indicating the modified data that is to be transmitted to a third volume, which is at the remote site, for the current database update;
means for synchronizing the second volume with the third volume for the current database update by transmitting the modified data from either the first volume or the second volume depending on bit setting in the first bitmap, to the third volume as indicated by the one or more bits in the second bitmap; and
second means for performing a point in time virtual copy of the modified data of the third volume to a fourth volume, which is at the remote site.

20. The system of claim 19, wherein the first bitmap represents a FlashCopy bitmap and the second bitmap represents a peer-to-peer remote copy (PPRC) bitmap.

21. The system of claim 19, wherein the first means performs a flashcopying of the modified data of the first volume to the second volume.

22. The system of claim 21, wherein the flashcopying initializes the one or more bits in the first bitmap.

23. The system of claim 19, wherein the second means performs a flashcopying of the modified data of the third volume to the fourth volume.

24. The system of claim 19, further comprising an application host that is associated with the first volume for performing the one or more incremental database updates.

25. The system of claim 19, further comprising means for staggering the one or more incremental database updates during the current database update.

26. The system of claim 25, wherein the means for staggering determines whether a synchronization for a previous database update is complete, after the destaging is performed for the current database update, and waits for the synchronization of the previous database update to complete before the transferring of the first bitmap to the second bitmap for the current database update.

27. The system of claim 26, wherein the means for staggering initializes the first bitmap for a next database update after the first means performs the point in time virtual copy for the current database update, and waits for the next database update after the means for synchronizing synchronizes the second volume with the third volume for the current database update.

28. The system of claim 19, wherein the means for synchronizing establishes a peer to peer remote copy session between the second volume and the third volume for physically transmitting the modified data of the second volume over the at least one communication link to the third volume.

29. The system of claim 19, wherein during the synchronizing, the first volume is accessible to a host at the primary site, and the fourth volume is accessible to a host at the remote site.

30. The system of claim 19, further comprising means for managing access to both the first volume and the second volume; and
means for managing access to the third volume and the fourth volume.

31. The system of claim 19, further comprising:
means for initializing the first bitmap to indicate that all data of the first volume is to be copied to the second volume, and all data that is copied to the second volume is to be copied to the third volume.

32. The system of claim 19, further comprising a recovery host that is associated with the fourth volume for recovering from a failure of the primary site by providing access to the fourth volume.

33. The system of claim 19, further comprising means for automatically initiating the incremental database updates.

34. The system of claim 19, wherein the means for destaging further compromises:
means for inspecting the one or more bits of the first bitmap at the primary site to determine whether the second volume includes data of the one or more tracks on the first volume that are to be overwritten with the modified data; and
means for performing a point in time virtual copy, from the first volume to the second volume, of the data of the one or more tracks on the first volume that are to be overwritten with the modified data if the first bitmap indicates that the second volume does not include the data of the one or more tracks on the first volume that are to be overwritten with the modified data.

35. The system of claim 19, wherein the at least one communication link comprises at least one of a channel link; a T1/T3 link; a Fibre channel; and an ESCON link.

36. A program storage device, tangibly embodying a program of instructions executable by a machine to perform a method for asynchronously transmitting one or more incremental database updates from a primary site to a remote site, the primary site and the remote site interconnected by at least one communication link, the method comprising:
- (a) destaging from cache memory modified data to a first volume at the primary site for a current database update and updating one or more bits in a first bitmap at the primary site that indicate one or more tracks on the first volume that are to be overwritten with the modified data, said updating one or more bits being a first point in time virtual copy of the modified data of the first volume to a second volume, wherein the first point in time virtual copy updates the first bitmap and no physical data is copied from the first volume to the second volume;
- (b) transferring the first bitmap to a second bitmap at the primary site for indicating the modified data that is to be transmitted to a third volume, which is at the remote site, for the current database update;
- (c) synchronizing the second volume with the third volume for the current database update by transmitting the modified data from either the first volume or the second volume depending on bit setting in the first bitmap, to the third volume as indicated by the one or more bits in the second bitmap; and
- (d) performing a second point in time virtual copy of the modified data of the third volume to a fourth volume, which is at the remote site.

37. The program storage device of claim 36, wherein the first bitmap represents a FlashCopy bitmap and the second bitmap represents a peer-to-peer remote copy (PPRC) bitmap.

38. The program storage device of claim 36, wherein the first point in time virtual copy is achieved by flashcopying the modified data of the first volume to the second volume.

39. The program storage device of claim 38, wherein the flashcopying initializes the one or more bits in the first bitmap.

40. The program storage device of claim 36, wherein the second point in time virtual copy is achieved by flashcopying the modified data of the third volume to the fourth volume.

41. The program storage device of claim 36, wherein the method further comprises providing an application host that is associated with the first volume for performing the one or more incremental database updates.

42. The program storage device of claim 36, further comprising staggering the one or more incremental database updates during the current database update.

43. The program storage device of claim 42, wherein the staggering comprises:
- determining whether a synchronization for a previous database update is complete after the destaging is performed for the current database update; and
- waiting for the synchronization of the previous database update to complete before the performing the first point in time virtual copy for the current database update.

44. The program storage device of claim 43, wherein the staggering further comprises:
- initializing the first bitmap for a next database update after the performing the first point in time virtual copy for the current database update; and
- waiting for the next database update after the synchronizing for the current database update.

45. The program storage device of claim 36, wherein the synchronizing is achieved by establishing a peer to peer remote copy session between the second volume and the third volume for physically transmitting the modified data of the second volume over the at least one communication link to the third volume.

46. The program storage device of claim 36, wherein the method further comprises providing a controller at the primary site for managing access to both the first volume and the second volume; and
- providing a controller at the remote site for managing access to the third volume and the fourth volume.

47. The program storage device of claim 36, wherein the method further comprises:
- initializing the first bitmap to indicate that all data of the first volume is to be copied to the second volume, and all data that is copied to the second volume is to be copied to the third volume.

48. The program storage device of claim 36, wherein the method further comprises providing a recovery host that is associated with the fourth volume for recovering from a failure of the primary site by providing access to the fourth volume.

49. The program storage device of claim 36, wherein the method further comprises automatically initiating the incremental database updates.

50. The program storage device of claim 36, wherein the destaging further comprises:
- inspecting the one or more bits of the first bitmap at the primary site to determine whether the second volume includes data of the one or more tracks on the first volume that are to be overwritten with the modified data; and
- performing a point in time virtual copy, from the first volume to the second volume, of the data of the one or more tracks on the first volume that are to be overwritten with the modified data if the first bitmap indicates that the second volume does not include the data of the one or more tracks on the first volume that are to be overwritten with the modified data.

51. The program storage device of claim 36, wherein the at least one communication link comprises at least one of a channel link; a T1/T3 link; a Fibre channel; and an ESCON link.

52. The program storage device of claim 36, wherein during the synchronizing, the first volume is accessible to a host at the primary site, and the fourth volume is accessible to a host at the remote site.

53. A method for backing up data from a primary site to a remote site, comprising:
- (a) destaging modified data from cache memory to a first volume at the primary site for a current database update;
- (b) performing a first point in time virtual copy of the modified data of the first volume to a second volume at the primary site by setting a first bitmap wherein no physical data is copied from the first volume to the second volume;
- (c) synchronizing the second volume with a third volume at the remote site by transmitting the modified data from either the first volume or the second volume depending on bit setting in the first bitmap, to the third volume; and
- (d) after completion of the synchronizing, performing a second point in time virtual copy of the modified data of the third volume to a fourth volume at the remote site;
- wherein, during the synchronizing, the first volume is accessible to a host at the primary site, and the fourth volume is accessible to a host at the remote site.

54. The method of claim 53, wherein the synchronizing step further includes inspecting the first bitmap to determine whether the modified data is on the first volume or the second volume.

* * * * *